US012365255B2

(12) United States Patent
Li et al.

(10) Patent No.: US 12,365,255 B2
(45) Date of Patent: Jul. 22, 2025

(54) DIRECT CURRENT FAST CHARGER SYSTEM WITH LOW STANDBY POWER

(71) Applicant: Rivian IP Holdings, LLC, Plymouth, MI (US)

(72) Inventors: Ming Li, Torrance, CA (US); Yang Liu, Irvine, CA (US); Tyler Erikson, Torrance, CA (US); Lixiang Wei, Irvine, CA (US); Steven E. Schulz, Torrance (CA)

(73) Assignee: Rivian IP Holdings, LLC, Irvine, CA (US)

( * ) Notice: Subject to any disclaimer, the term of this patent is extended or adjusted under 35 U.S.C. 154(b) by 887 days.

(21) Appl. No.: 17/546,146

(22) Filed: Dec. 9, 2021

(65) Prior Publication Data

US 2023/0182586 A1 Jun. 15, 2023

(51) Int. Cl.
| | |
|---|---|
| H02J 7/04 | (2006.01) |
| B60L 53/10 | (2019.01) |
| H02J 9/00 | (2006.01) |
| H02M 1/08 | (2006.01) |
| H02M 3/156 | (2006.01) |
| H02M 7/28 | (2006.01) |
| B60L 53/30 | (2019.01) |
| B60L 53/60 | (2019.01) |
| H02J 7/00 | (2006.01) |

(52) U.S. Cl.
CPC ............... B60L 53/11 (2019.02); H02J 7/04 (2013.01); H02J 9/005 (2013.01); H02M 1/08 (2013.01); H02M 3/156 (2013.01); H02M 7/28 (2013.01); B60L 53/305 (2019.02); B60L 53/60 (2019.02); H02J 7/0031 (2013.01); H02J 2207/20 (2020.01)

(58) Field of Classification Search
CPC ........ B60L 53/11; B60L 53/305; B60L 53/60; B60L 53/00; H02J 7/04; H02J 2207/20; H02J 9/005; H02J 7/00036; H02J 7/0031; H02J 7/0063; H02J 7/0068; H02J 3/007; H02J 3/02; H02M 1/08; H02M 3/156; H02M 7/28; H01M 10/44
USPC ....................................................... 320/109
See application file for complete search history.

(56) References Cited

U.S. PATENT DOCUMENTS

| | | | |
|---|---|---|---|
| 8,368,252 B2 * | 2/2013 | Pabon | H02M 7/219 307/31 |
| 2011/0128153 A1 * | 6/2011 | Sims | G06F 1/325 307/66 |

(Continued)

FOREIGN PATENT DOCUMENTS

WO WO-2011051824 A1 * 5/2011 ........ H02M 3/33523

*Primary Examiner* — Julian D Huffman
*Assistant Examiner* — Aiman Bickiya
(74) *Attorney, Agent, or Firm* — Foley & Lardner LLP

(57) ABSTRACT

A direct current fast charge (DCFC) system and associated method that lower standby power dramatically when the DCFC system is not in operation, and that provide a reset capability for communication needs. The DCFC system utilizes an appropriate load disconnection switch and an associated control and communication circuit, timer circuit, and automatic turn on system. This improves the reliability of the electronics by removing voltage stress during the standby mode. The DCFC system prevents energy waste, and therefore provides a "green" alternative to conventional DCFC systems.

21 Claims, 15 Drawing Sheets

(56) References Cited

U.S. PATENT DOCUMENTS

| | | | |
|---|---|---|---|
| 2014/0369084 A1* | 12/2014 | Freeman | H02M 3/33523 |
| | | | 363/16 |
| 2017/0244269 A1* | 8/2017 | Tiainen | H02J 7/00 |
| 2021/0094427 A1* | 4/2021 | Galin | H02J 7/0042 |
| 2021/0313884 A1* | 10/2021 | Platzer | H02M 3/158 |
| 2021/0344270 A1* | 11/2021 | Ren | H02M 1/346 |
| 2022/0109323 A1* | 4/2022 | Hausman, Jr. | H02J 3/466 |

* cited by examiner

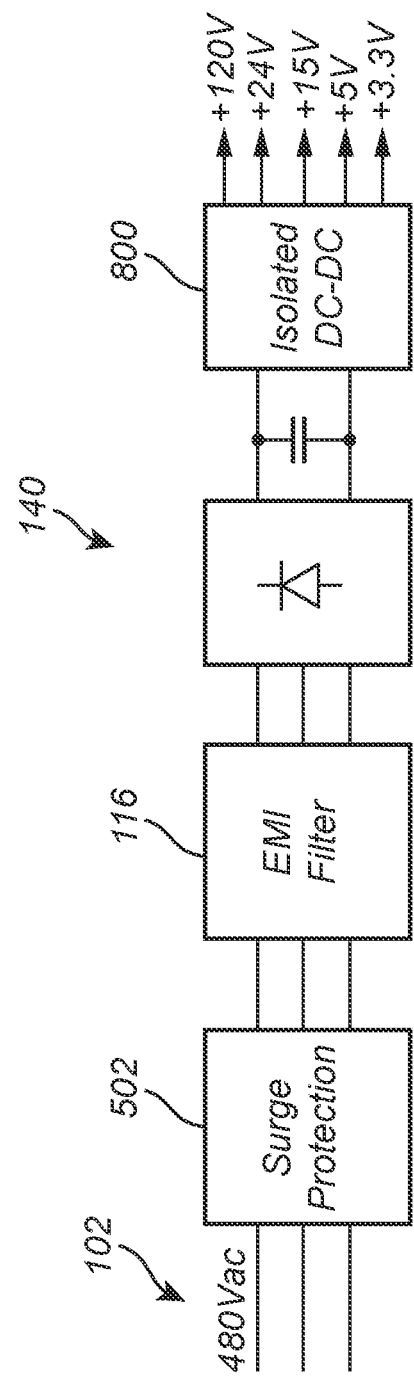

DIRECT CURRENT FAST CHARGER SYSTEM WITH LOW STANDBY POWER

INTRODUCTION

The present disclosure relates generally to the electric vehicle (EV) and battery charging fields. More particularly, the present disclosure relates to a direct current fast charger (DCFC) system with low standby power for use in EV and other battery charging applications.

DCFC systems with standby power may have power losses associated with on-board power supplies, integrated circuits (ICs), bleeding resistance, and leakage paths of dispensers and power cabinets when the DCFC systems are not charging an EV or other battery. For example, a DCFC input (e.g., 480V) may have power losses, particularly when not charging an EV or other battery, when coupled to "direct" (e.g., 480V) loads in the power stage, such as power electronics module (PEM) stages, fans, and dispensers, and when coupled to "indirect" (e.g., 24V) loads, which may include multiple 24V power loads, such as PEM controllers (PCCs), a cabinet master controller (PCU), an insulation monitoring device (IMD), circuit breakers, pumps, stir fans, a modem, and an Ethernet switch. Further, DCFC systems may require reset capabilities for communication needs.

The present background is provided as illustrative environmental context only. It will be readily apparent to those of ordinary skill in the art that the principles and concepts of the present disclosure may be implemented in other environmental contexts equally. Therefore, the present background should be considered to be non-limiting for all purposes.

BRIEF SUMMARY

In various illustrative embodiments, the present disclosure provides a DCFC system and associated method that lower standby power dramatically when the DCFC system is not in operation, and that provide a reset capability (e.g. turn on/off 24V) for communication needs. This improves the reliability of the electronics by removing voltage stress during the standby mode, especially in humid environmental conditions, for example. The DCFC system of the present disclosure prevents energy waste, and therefore provides a "green" alternative to conventional DCFC systems.

In one illustrative embodiment, the present disclosure provides a battery charging system, including: a voltage input; a plurality of loads associated with the battery charging system connected to the voltage input when the battery charging system is in a charging mode; and a switch operable for disconnecting certain of the plurality of loads from the voltage input when the battery charging system is in a standby mode to reduce standby power of the battery charging system. The plurality of loads include one or more direct loads at a voltage of the voltage input and one or more indirect loads at a voltage that is lower than the voltage of the voltage input. In one embodiment, the switch is operable for disconnecting certain of the indirect loads from the voltage input when the battery charging system is in the standby mode. In another embodiment, the switch is operable for disconnecting all of the indirect loads from the voltage input when the battery charging system is in the standby mode. In a further embodiment, the switch is operable for disconnecting certain of the direct loads and all of the indirect loads from the voltage input when the battery charging system is in the standby mode. In a still further embodiment, the switch is operable for disconnecting all of the direct loads and all of the indirect loads from the voltage input when the battery charging system is in the standby mode. The battery charging system also includes a communications and control circuit and an external communications link coupled to the switch and operable for controlling operation of the switch. Optionally, the battery charging system further includes an auxiliary power supply coupled to the communications and control circuit that is at a voltage that is lower than a voltage of the voltage input. The communications and control circuit includes a timing circuit operable for, after a predetermined period of time, restoring the charging mode of the battery charging system after the battery charging system is put into the standby mode.

In another illustrative embodiment, the present disclosure provides a battery charging method, including: connecting a plurality of loads associated with a battery charging system to a voltage input when the battery charging system is in a charging mode; and, using a switch, disconnecting certain of the plurality of loads from the voltage input when the battery charging system is in a standby mode to reduce standby power of the battery charging system. The plurality of loads include one or more direct loads at a voltage of the voltage input and one or more indirect loads at a voltage that is lower than the voltage of the voltage input. In one embodiment, disconnecting certain of the plurality of loads from the voltage input includes disconnecting certain of the indirect loads from the voltage input when the battery charging system is in the standby mode. In another embodiment, disconnecting certain of the plurality of loads from the voltage input includes disconnecting all of the indirect loads from the voltage input when the battery charging system is in the standby mode. In a further embodiment, disconnecting certain of the plurality of loads from the voltage input includes disconnecting certain of the direct loads and all of the indirect loads from the voltage input when the battery charging system is in the standby mode. In a still further embodiment, disconnecting certain of the plurality of loads from the voltage input includes disconnecting all of the direct loads and all of the indirect loads from the voltage input when the battery charging system is in the standby mode. The battery charging method also includes controlling operation of the switch using a communications and control circuit and an external communications link coupled to the switch. Optionally, the battery chagrining method further includes powering the communications and control circuit using an auxiliary power supply coupled to the communications and control circuit that is at a voltage that is lower than a voltage of the voltage input. The battery charging method still further includes, after a predetermined period of time, restoring the charging mode of the battery charging system after the battery charging system is put into the standby mode using a timing circuit of the communications and control circuit.

In a further illustrative embodiment, the present disclosure provides a battery charging system, including: a 480V voltage input; a plurality of loads associated with the battery charging system connected to the 480V voltage input when the battery charging system is in a charging mode, wherein the plurality of loads include one or more direct loads at 480V and one or more indirect loads at 24V; and a switch operable for disconnecting certain of the plurality of loads from the 480V voltage input when the battery charging system is in a standby mode to reduce standby power of the battery charging system; wherein the switch is operable for one or more of: disconnecting certain of the 24V indirect loads from the 480V voltage input when the battery charging system is in the standby mode; disconnecting all of the 24V indirect loads from the 480V voltage input when the battery charging system is in the standby mode; disconnecting certain of the 480V direct loads and all of the 24V indirect loads from the 480V voltage input when the battery charging system is in the standby mode; and disconnecting all of the 480V direct loads and all of the 24V indirect loads from the 480V voltage input when the battery charging system is in the standby mode. The battery charging system also includes a communications and control circuit and an external communications link coupled to the switch and operable for controlling operation of the switch.

In a still further illustrative embodiment, the present disclosure provides a battery charging system, including: a voltage input; one or more secondary power supplies coupled to the voltage input and configured to receive the voltage input and output a voltage lower than the voltage input; direct loads coupled to the voltage input; indirect loads configured to be coupled to the one or more secondary power supplies; a switch disposed between the indirect loads and the one or more secondary power supplies; a control circuit directly or indirectly coupled to the switch; and a communications circuit directly or indirectly coupled to the switch; wherein the control circuit and the communications circuit are configured to control the switch to selectively disconnect certain or all of the indirect loads from the one or more secondary power supplies when the battery charging system is in a standby mode. Optionally, one or more of the control circuit and the communications circuit are powered by the one or more secondary power supplies. Alternatively, one or more of the control circuit and the communications circuit are powered by an auxiliary power supply coupled to the voltage input. Optionally, certain of the one or more secondary power supplies are turned off in the standby mode. One or more of the control circuit and the communications circuit include a timing circuit configured to, after a predetermined period of time, restore a charging mode of the battery charging system after the battery charging system is put into the standby mode by selectively reconnecting the certain of the indirect loads to the one or more secondary power supplies. Optionally, one or more of the control circuit and the communications circuit include a timing circuit configured to control the switch to selectively disconnect certain of the indirect loads from the one or more secondary power supplies and subsequently reconnect the certain of the indirect loads to the one or more secondary power supplies after a predetermined period of time. The direct loads operate at a voltage of the voltage input (e.g., 300-500V) and the indirect loads operate at a voltage lower than a voltage of the voltage input.

In a still further illustrative embodiment, the present disclosure provides a battery charging system, including: a voltage input; direct loads configured to be coupled to the voltage input; one or more secondary power supplies coupled to the voltage input and configured to receive the voltage input and output a voltage lower than the voltage input; indirect loads configured to be coupled to the one or more secondary power supplies; a switch disposed between the voltage input and the direct loads, the one or more secondary power supplies, and the indirect loads; a control circuit directly or indirectly coupled to the switch; and a communications circuit directly or indirectly coupled to the switch; wherein the control circuit and the communications circuit are configured to control the switch to selectively disconnect certain or all of the direct loads, the one or more secondary power supplies, and the indirect loads from the voltage input when the battery charging system is in a standby mode. Optionally, one or more of the control circuit and the communications circuit are powered by the one or more secondary power supplies. Alternatively, one or more of the control circuit and the communications circuit are powered by an auxiliary power supply and a surge protector coupled to the voltage input. Optionally, the battery charging system further includes one or more additional direct loads coupled to the voltage input between the voltage input and the switch. One or more of the control circuit and the communications circuit include a timing circuit configured to, after a predetermined period of time, restore a charging mode of the battery charging system after the battery charging system is put into the standby mode by selectively reconnecting the certain of the direct loads, the one or more secondary power supplies, and the indirect loads to the voltage input. Optionally, one or more of the control circuit and the communications circuit include a timing circuit configured to control the switch to selectively disconnect certain of the direct loads, the one or more secondary power supplies, and the indirect loads from the voltage input and subsequently reconnect the certain of the direct loads, the one or more secondary power supplies, and the indirect loads to the voltage input after a predetermined period of time. The direct loads operate at a voltage of the voltage input (e.g., 300-500V) and the indirect loads operate at a voltage lower than a voltage of the voltage input.

In a still further illustrative embodiment, the present disclosure provides a battery charging method, including: selectively disconnecting certain or all indirect loads from one or more secondary power supplies coupled to a voltage input and configured to receive the voltage input and output a voltage lower than the voltage input when the battery charging system is in a standby mode; wherein direct loads are also coupled to the voltage input; and wherein the certain or all indirect loads are selectively disconnected from the one or more secondary power supplies using a switch disposed between the indirect loads and the one or more secondary power supplies, a control circuit directly or indirectly coupled to the switch, and a communications circuit directly or indirectly coupled to the switch.

In a still further illustrative embodiment, the present disclosure provides a battery charging method, including: selectively disconnecting certain or all of direct loads, one or more secondary power supplies configured to receive a voltage input and output a voltage lower than the voltage input, and indirect loads coupled to the one or more secondary power supplies from the voltage input when the battery charging system is in a standby mode; wherein the certain or all of the direct loads, the one or more secondary power supplies, and the indirect loads are selectively disconnected from the voltage input using a switch disposed between the voltage input and the direct loads, the one or more secondary power supplies, and the indirect loads, a control circuit directly or indirectly coupled to the switch, and a communications circuit directly or indirectly coupled to the switch.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby. Of note, aspects of certain illustrated and described embodiments may be implemented in conjunction with aspects of other illustrated and described embodiments, without limitation, and aspects of certain illustrated and described embodiments may be omitted, without departing from the spirit and scope of the present disclosure.

BRIEF DESCRIPTION OF THE DRAWINGS

The present disclosure is illustrated and described herein with reference to the various drawings, in which like reference numbers are used to denote like system components/method steps, as appropriate, and in which:

FIG. 15 is a schematic diagram illustrating one example auxiliary power supply of the present disclosure.

DETAILED DESCRIPTION

Again, DCFC systems may have large standby power in terms of the dispensers and power cabinet. This is a waste of energy as power losses are associated with the on-board power supplies and ICs, bleeding resistance, and leakage paths. For example, a DCFC input (e.g., 480V) may be coupled to "direct" (e.g., 480V) loads in the power stage, such as PEM stages, fans, and dispensers. The DCFC input may also be coupled to "indirect" (e.g., 24V) loads, including multiple 24V power loads, for example, such as PCCs, a PCU, an IMD, circuit breakers, pumps, stir fans, a modem, and an Ethernet switch, which may disadvantageously be powered when not charging an EV or other battery. Further, DCFC systems may require reset capabilities for communication needs.

Figure 1:
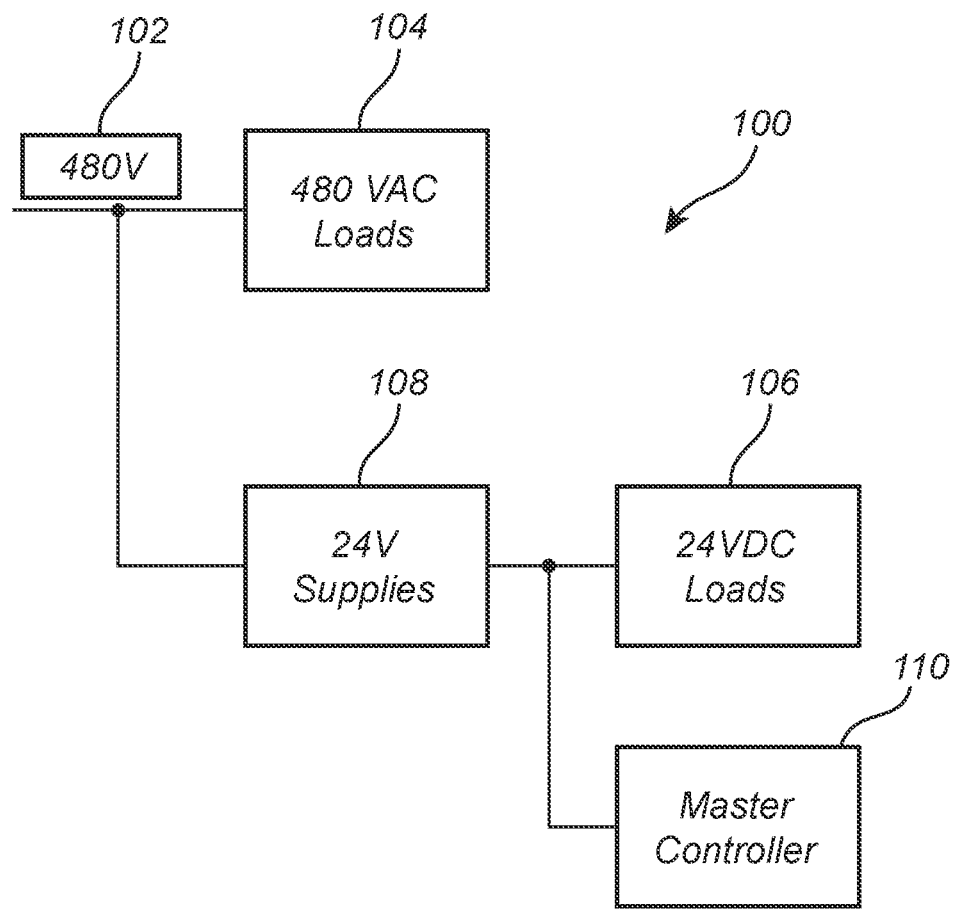
FIG. 1 is a schematic diagram illustrating the various "direct" and "indirect" loads on a DCFC input in a DCFC system.

FIG. 1 is a schematic diagram illustrating the various "direct" and "indirect" loads on a 480V DCFC input 102 in a DCFC system 100. The "direct" loads include 480V alternating current (AC) loads 104, and the "indirect" loads include 24V direct current (DC) loads 106 coupled to multiple 24V supplies 108 as well as a master controller 110. As mentioned above, the 480 VAC loads 104 may include the PEM stages, fans, and dispensers. The 24 VDC loads 106 may include the PCCs, the PCU 110, the IMD, circuit breakers, pumps, stir fans, the modem, and the Ethernet switch. Thus, the 480 VAC line may have a standby power of about 200 W, including the 24V loads 106 and master controller 110. The 24 VDC line may have a standby power of about 140 W. This is a waste of energy as power losses are associated with the on-board power supplies and ICs, bleeding resistance, and leakage paths.

Figure 2:
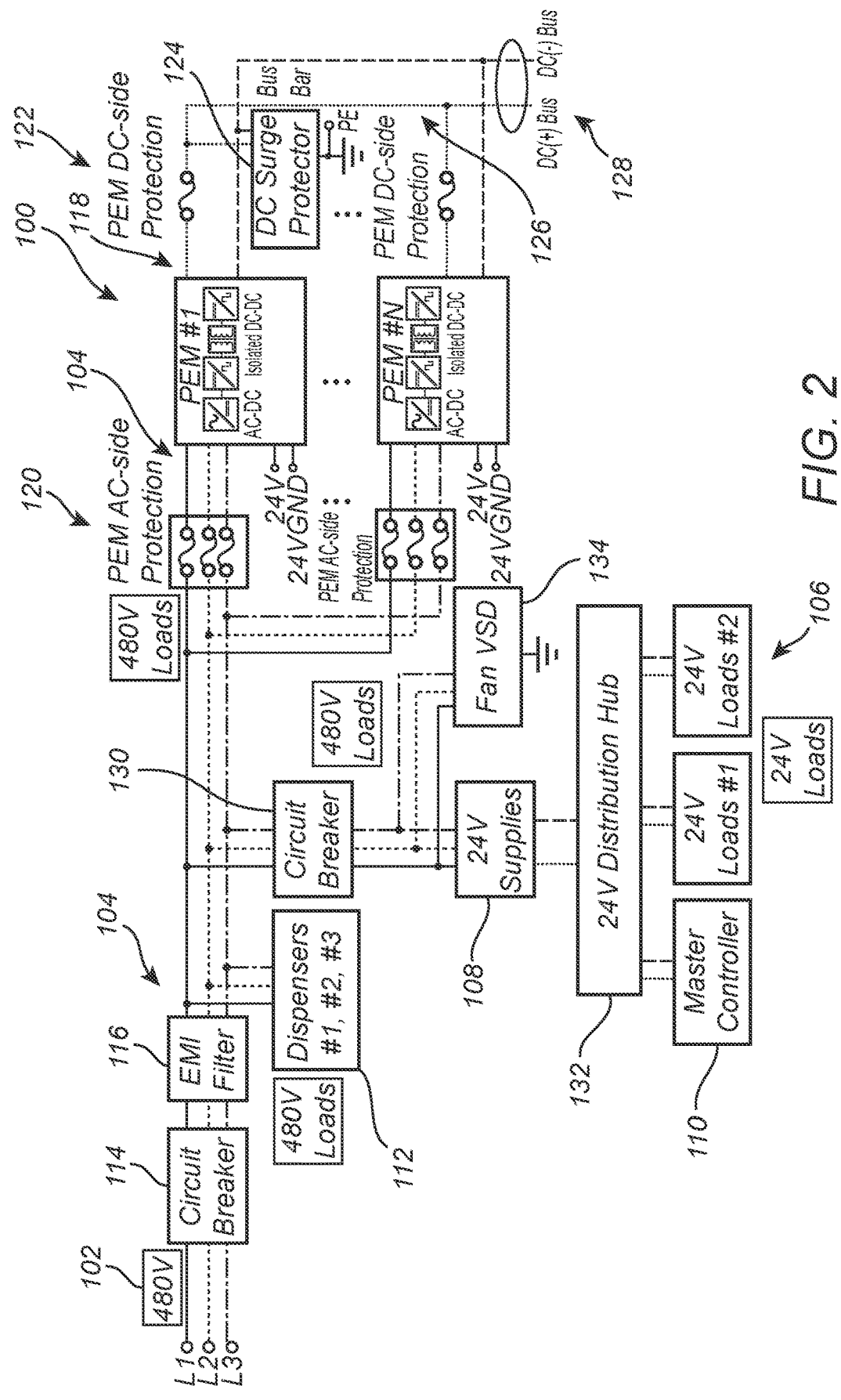
FIG. 2 is another schematic diagram illustrating the various "direct" and "indirect" loads on a DCFC input in a DCFC system in more detail.

FIG. 2 is another schematic diagram illustrating the various "direct" and "indirect" loads on the 480V DCFC input 102 in the DCFC system 100 in more detail. Here, the 480V DCFC input 102 is coupled to the dispensers 112 through a circuit breaker 114 and electromagnetic interference (EMI) filter 116. The dispensers 112 represent a 480 VAC load 104. Other 480 VAC loads 104 include the PEMS 118, which are each coupled between PEM AC-side protection 120 and PEM DC-side protection 122, as well as a DC surge protector 124, a bus bar 126, and an EMI core 128. The 24V supplies 108 are coupled to the 480V DCFC input 102 through another circuit breaker 130, and also to a 24V distribution hub 132. A fan 134 acts as a further 480 VAC load 104 at this junction. The 24 VDC loads 106, including the master controller 110 are coupled to the 24V distribution hub 132.

Figure 3:
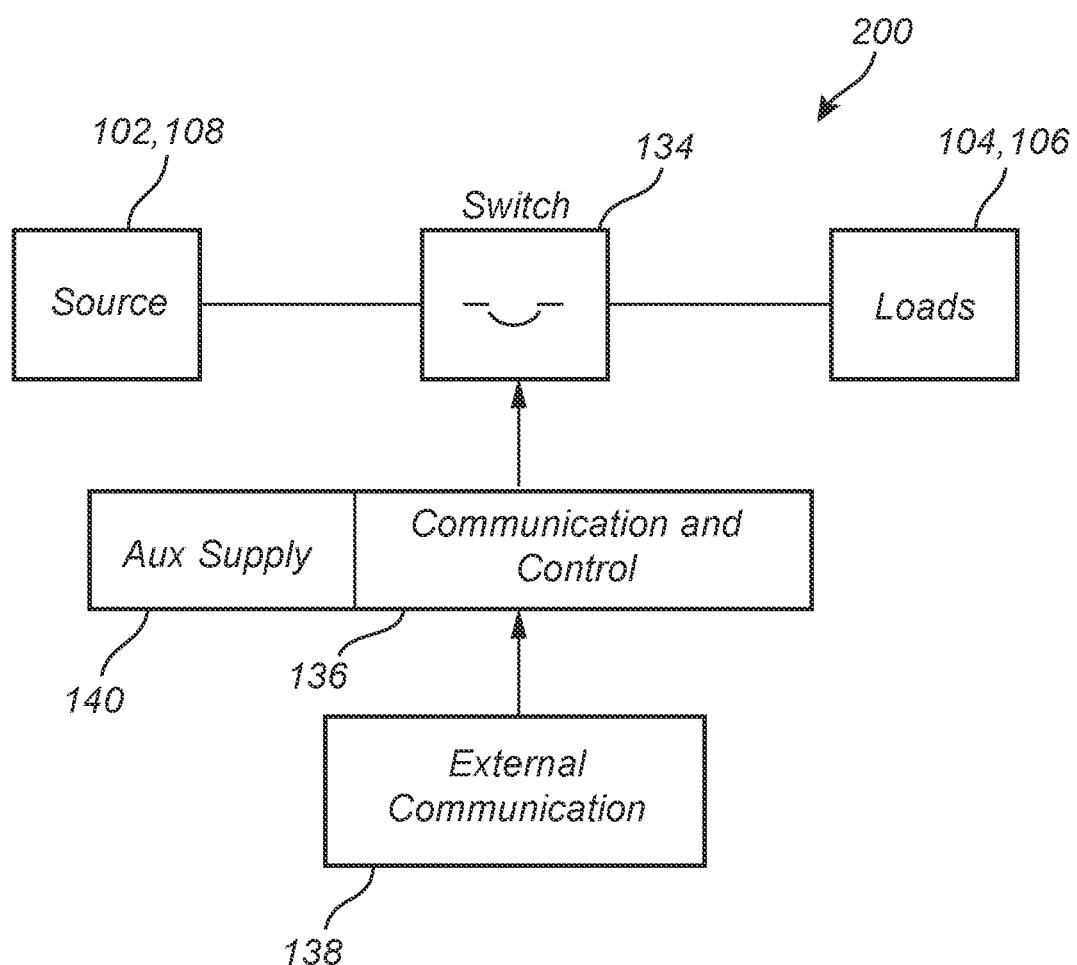
FIG. 3 is a schematic diagram illustrating the general standby power reduction and reset capability concept of the DCFC system and method of the present disclosure.

Given the above context, FIG. 3 is a schematic diagram illustrating the general standby power reduction and reset capability concept of the DCFC system and method 200 of the present disclosure. It can be seen that the 480V DCFC input 102 and/or the 24V supplies 108 are coupled to the 480 VAC loads 104 and/or the 24 VDC loads 106 via one or more intervening switches 134. As used herein, the functionality of any single described "switch" may also be performed by multiple switches, without limitation. This circuit design and the associated control strategies allow for the selective connection/disconnection of the "direct" and "indirect" loads to reduce standby power. A communication and control circuit 136 and external communication means 138 are coupled to the switch 134 to control operation and provide system protection during standby mode, as well as, in some cases, an auxiliary power supply 140 that is used during standby mode. Through this communication and control circuit 136, a 24V reset is provided for communication purposes, such as a 10 sec off-automatic turn on, reset, for example. This concept is implemented in several illustrative embodiments, described in greater detail herein below.

Figure 4:
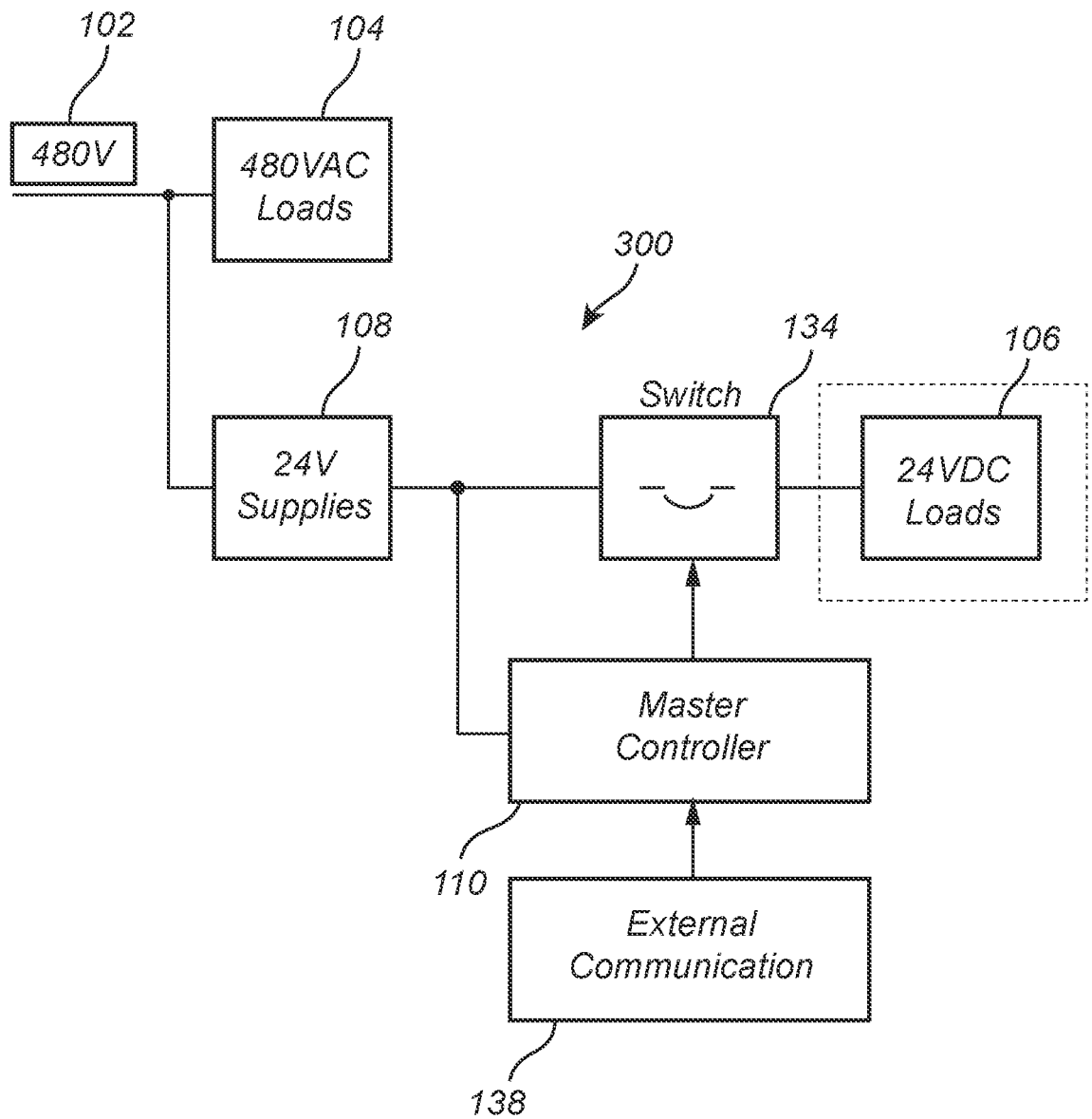
FIG. 4 is a schematic diagram illustrating one example embodiment of the DCFC system and method of the present disclosure, removing partial standby power.

FIG. 4 is a schematic diagram illustrating one example embodiment of the DCFC system and method 300 of the present disclosure, removing partial standby power. Here, the "direct" 480 VAC loads 104 are continuously coupled to the 480V DCFC input 102 (also referred to herein as the "voltage input"), as are the 24V supplies 108 (also referred to herein as the "secondary power supplies"). The switch 134, which may be a small-current switch, is used to selectively disconnect some of the "indirect" 24 VDC loads 106. The master controller 110 and external communication link 138 are coupled to and control the switch 134. In this configuration, the master controller 110 is continuously powered by the 24V supplies 108 (at 10 W, for example), so no auxiliary power supply is required. Only some of the 24 VDC loads 106 are selectively disconnected by the switch 134 in standby mode, when the DCFC system 300 is not used to charge, to lower standby power.

Figure 5:
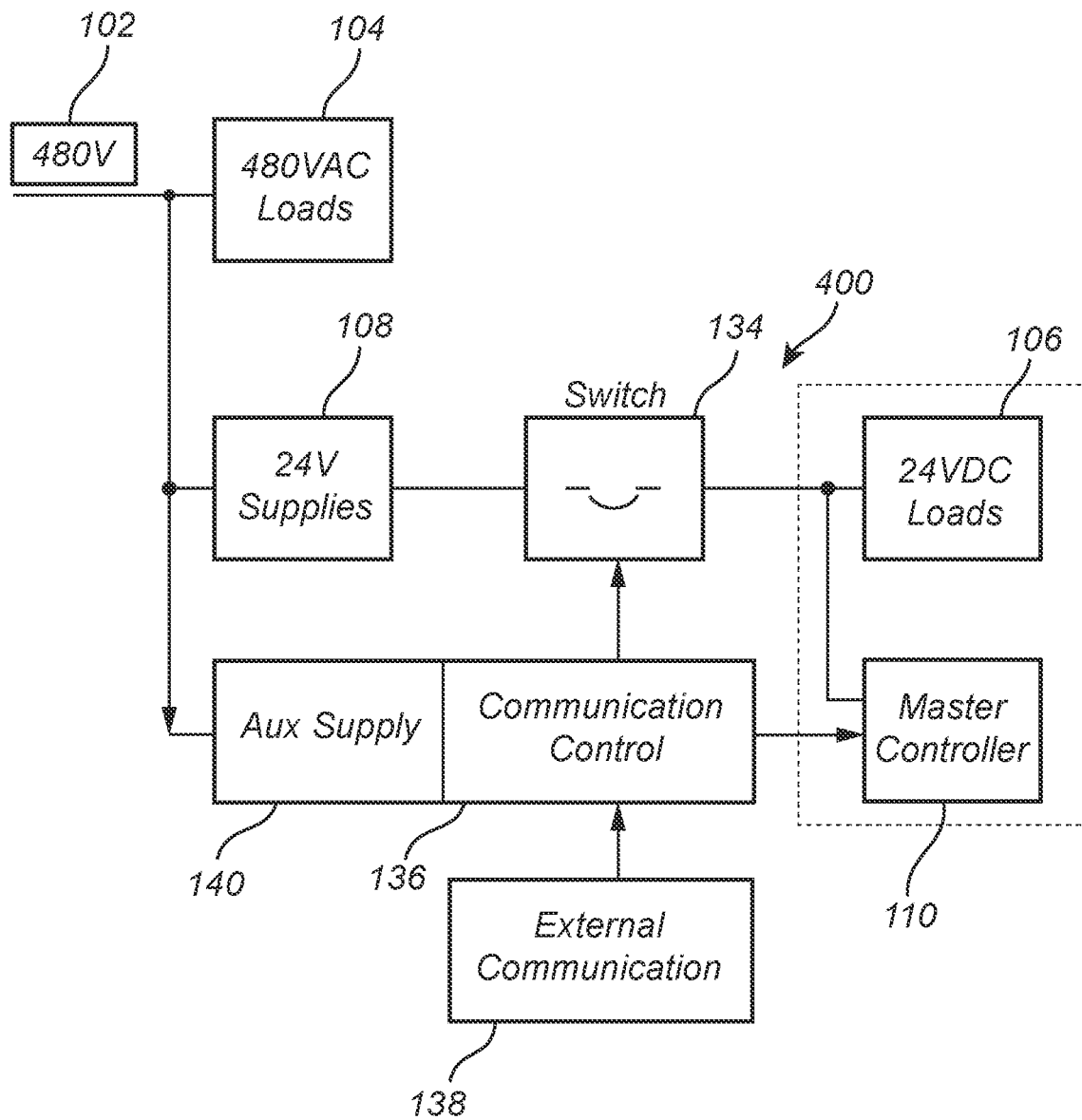
FIG. 5 is a schematic diagram illustrating another example embodiment of the DCFC system and method of the present disclosure, again removing partial standby power.

FIG. 5 is a schematic diagram illustrating another example embodiment of the DCFC system and method 400 of the present disclosure, again removing partial standby power. Here, the "direct" 480 VAC loads 104 are continuously coupled to the 480V DCFC input 102, as are the 24V supplies 108. However, the outputs of the 24V supplies 108 are turned off in standby mode. The switch 134, which again may be a small-current switch, is used to selectively disconnect more of the "indirect" 24 VDC loads 106, including the master controller 110, such as the PCU in the power cabinet. The communication and control circuit 136 and external communication link 138 are coupled to and control the switch 134. In this configuration, the communication and control circuit 136 and master controller 110 are powered by the auxiliary power supply 140 coupled to the 480V DCFC input 102 when the outputs of the 24V supplies 108 are turned off in standby mode. Thus, more of the 24 VDC loads 106 are selectively disconnected by the switch 134 and the inactive outputs of the 24V supplies 108 in standby mode, when the DCFC system 400 is not used to charge, to lower standby power.

Figure 6:
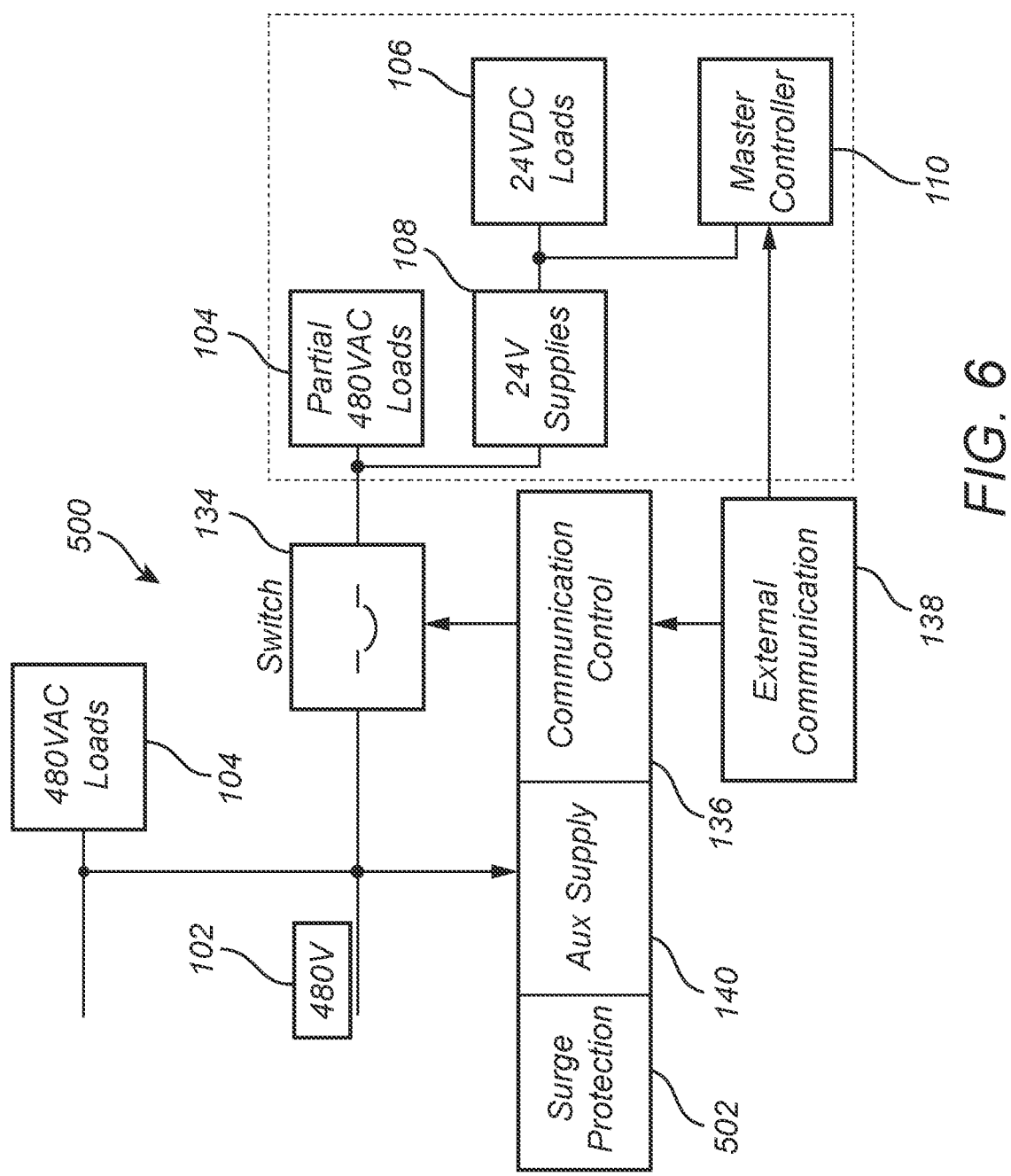
FIG. 6 is a schematic diagram illustrating a further example embodiment of the DCFC system and method of the present disclosure, again removing partial standby power.

FIG. 6 is a schematic diagram illustrating a further example embodiment of the DCFC system and method 500 of the present disclosure, again removing partial standby power. Here, some of the "direct" 480 VAC loads 104 are continuously coupled to the 480V DCFC input 102. The switch 134, which again may be a small-current switch, is used to selectively disconnect some of the "direct" 480 VAC loads 104, the 24V supplies 108, and all of the "indirect" 24 VDC loads 106, including the master controller 110, such as the PCU in the power cabinet. The partial 480 VAC loads 104 cut can include lower power loads, such as a condenser fan or the like, but can also include selected dispensers 112 (FIG. 2) and PEMs (FIG. 2) and the like. The communication and control circuit 136 and external communication link 138 are coupled to and control the switch 134. In this configuration, the communication and control circuit 136 and master controller 110 are powered by the auxiliary power supply 140 coupled to the 480V DCFC input 102. Thus, a significant portion of the 480 VAC loads 104 and the 24 VDC loads 106 are selectively disconnected by the switch 134 in standby mode, when the DCFC system 500 is not used to charge, to lower standby power. Here, a surge protector 502 is optionally coupled to the auxiliary power supply 140 due to the 480 VAC load cut.

Figure 7:
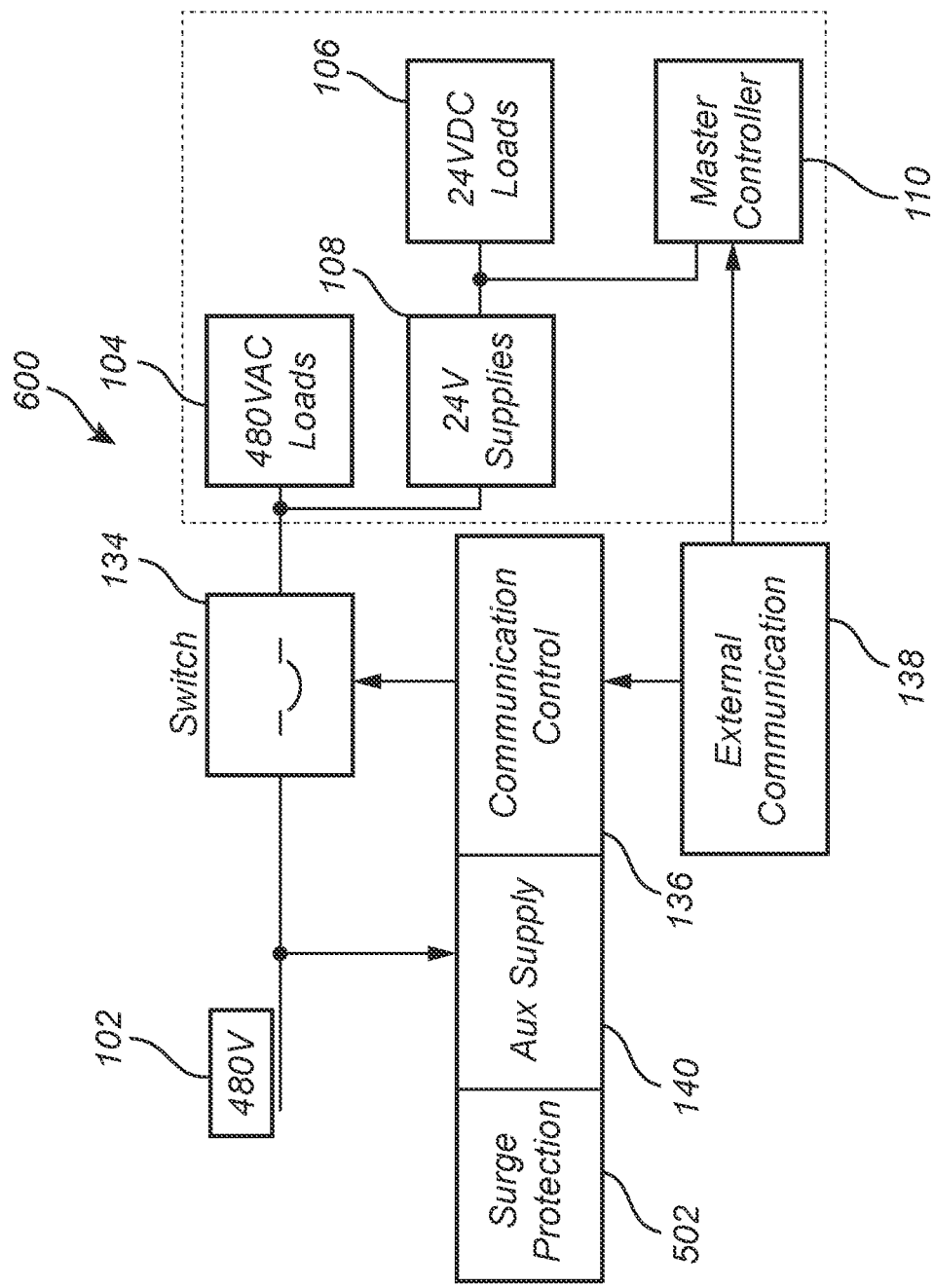
FIG. 7 is a schematic diagram illustrating a still further example embodiment of the DCFC system and method of the present disclosure, removing substantially all standby power.

FIG. 7 is a schematic diagram illustrating a still further example embodiment of the DCFC system and method 600 of the present disclosure, removing substantially all standby power. Here, all of the "direct" 480 VAC loads 104 are selectively disconnected from the 480V DCFC input 102. The switch 134, which now must be a high-current switch relative to the small-current switch used above, is used to selectively disconnect all of the "direct" 480 VAC loads 104, the 24V supplies 108, and all of the "indirect" 24 VDC loads 106, including the master controller 110, such as the PCU in the power cabinet. The communication and control circuit 136 and external communication link 138 are coupled to and control the switch 134. In this configuration, the communication and control circuit 136 and master controller 110 are powered by the auxiliary power supply 140 coupled to the 480V DCFC input 102. Thus, all of the 480 VAC loads 104 and the 24 VDC loads 106 are selectively disconnected by the switch 134 in standby mode, when the DCFC system 500 is not used to charge, to lower standby power. Again, a surge protector 502 is optionally coupled to the auxiliary power supply 140 due to the 480 VAC load cut.

Figure 8:
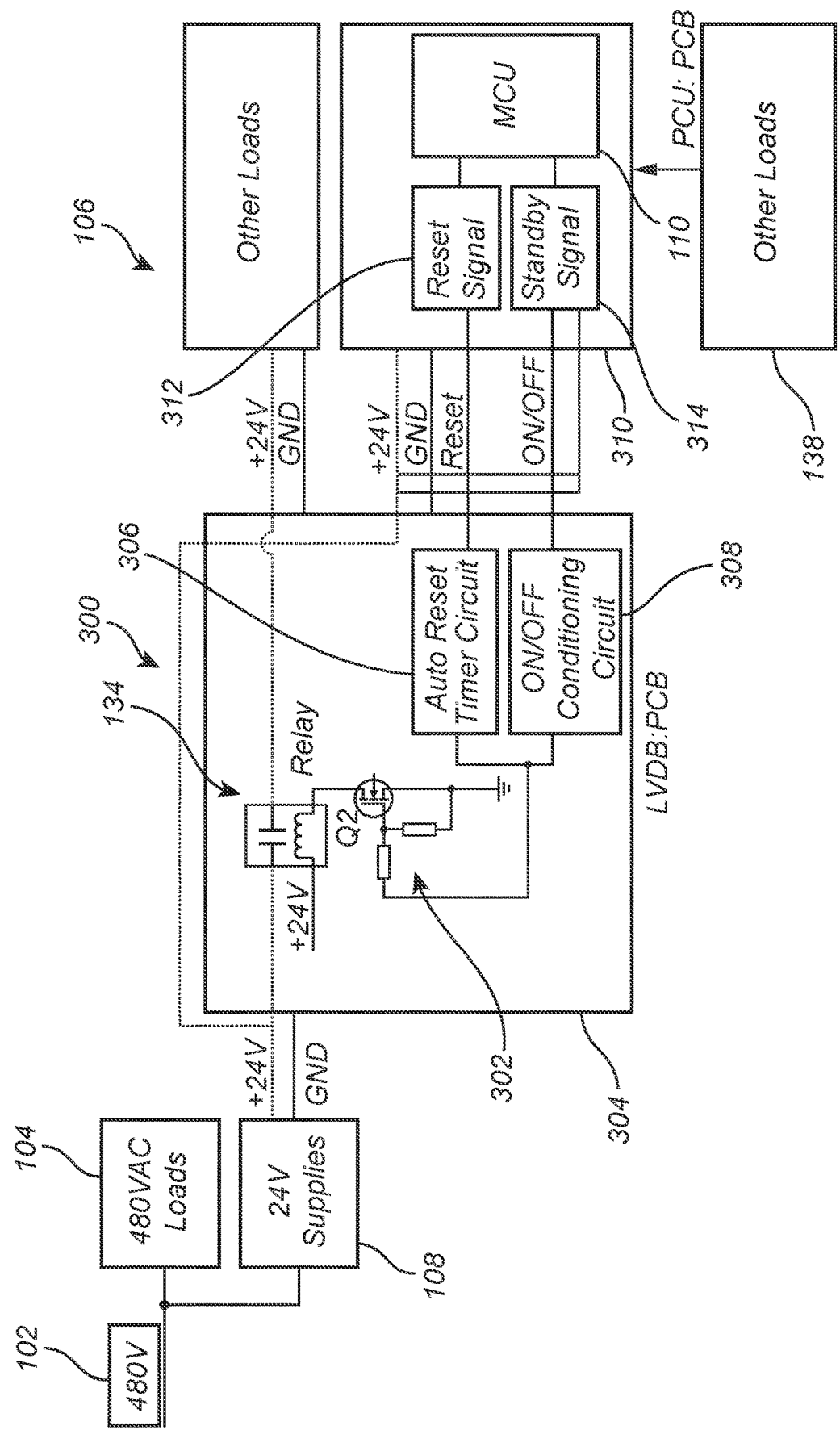
FIG. 8 is a schematic diagram illustrating one example implementation of the DCFC system and method of FIG. 4, removing partial standby power.

FIG. 8 is a schematic diagram illustrating one example implementation of the DCFC system and method 300 of FIG. 4, removing partial standby power. Again, here, the "direct" 480 VAC loads 104 are continuously coupled to the 480V DCFC input 102, as are the 24V supplies 108. The switch 134, which may be a small-current switch, is used to selectively disconnect some of the "indirect" 24 VDC loads 106. The master controller 110 and external communication link 138 are coupled to and control the switch 134. In this configuration, the master controller 110 is continuously powered by the 24V supplies 108 (at 10 W, for example), so no auxiliary power supply is required. Only some of the 24 VDC loads 106 are selectively disconnected by the switch 134 in standby mode, when the DCFC system 300 is not used to charge, to lower standby power. In this case, the PCU 110 is the primary 24 VDC load 106 that is kept alive. The switch 134 is implemented as a relay. The metal-oxide-semiconductor field-effect transistor (MOSFET) switch 302 is disposed on the low voltage distribution board (LVDB) printed circuit board (PCB) 304. The LVDB PCB 304 also includes an auto reset timer circuit 306 that energizes the switch 134 after a predetermined shutdown time period (e.g. 1 sec or 10 sec) and an ON/OFF conditioning circuit 308. The master controller 110 is disposed on the PCU PCB 310 and is operable for sending a reset signal 312 to the auto reset timer circuit 306 and a standby signal 314 to the ON/OFF conditioning circuit 308.

Figure 9:
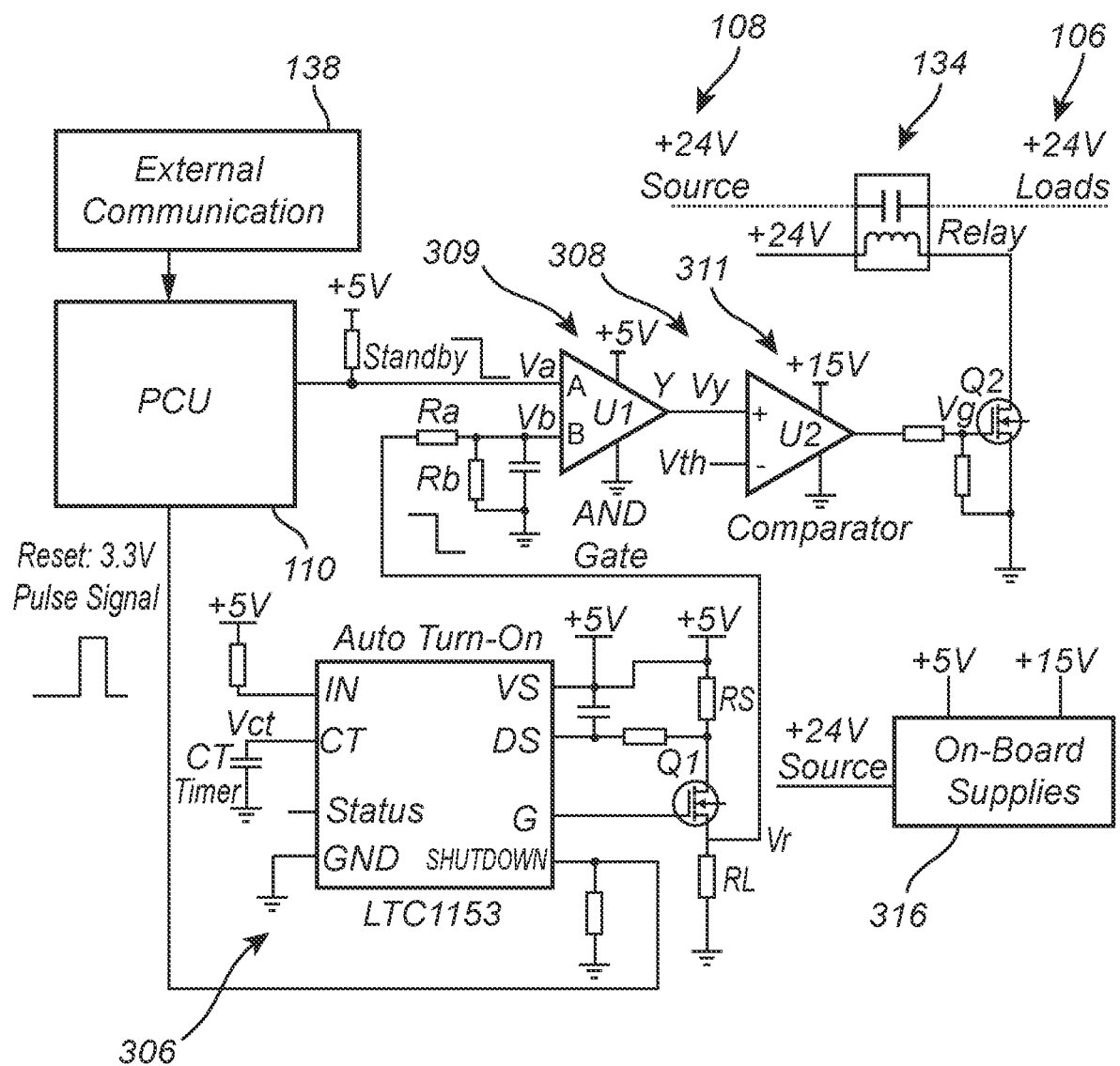
FIG. 9 is a schematic diagram illustrating signal conditioning of the DCFC system and method of FIGS. 4 and 8, removing partial standby power.

FIG. 9 is a schematic diagram illustrating signal conditioning of the DCFC system and method 300 of FIGS. 4 and 8, removing partial standby power. The relay/switch circuit 134 for partially removing the 24 VDC loads 106 can use normally-open or normally-closed type devices, depending on the control logic used. The PCU 110 sends standby and/or reset commands, both of which are active during the low standby power mode in this implementation, as the PCU 110 is alive and powered by the 24V power supplies 108. The auto reset timer circuit 306 energizes the switch 134 after a predetermined shutdown time period (e.g. 1 sec or 10 sec), such as after a reset. The ON/OFF conditioning circuit 308 includes an AND gate 309 and a voltage comparator 311 for signal conditioning, and Vth can be adjustable, such as 2.5V. On-board low power supply circuits 316 are coupled to the 24V power supplies 108 and used for signal conditioning. Here, reset is accomplished using a 3.3V pulse signal, for example.

Figure 10:
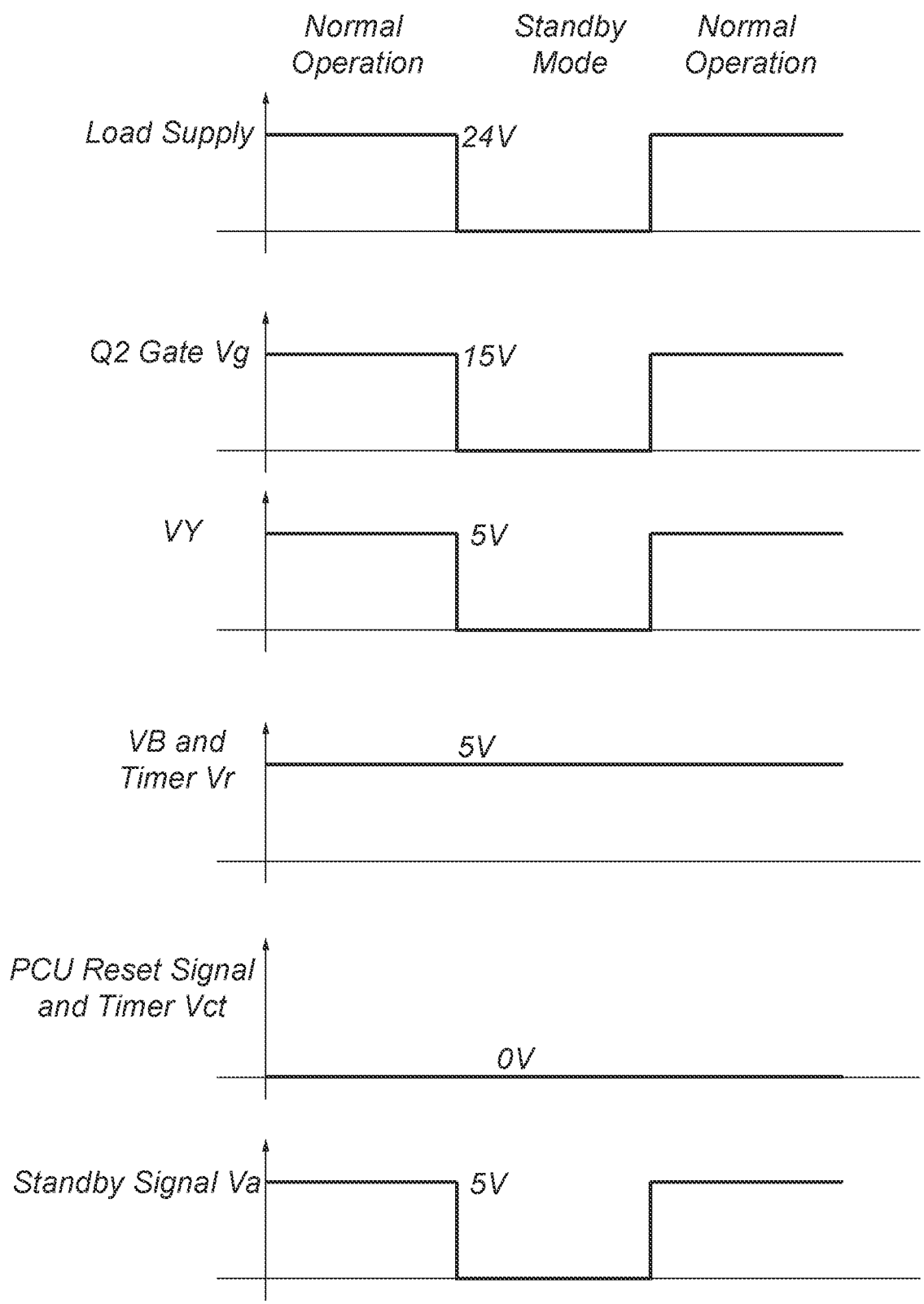
FIG. 10 is a time diagram illustrating standby mode operation of the DCFC system and method of FIGS. 4 and 8, removing partial standby power.

FIG. 10 is a time diagram illustrating standby mode operation of the DCFC system and method 300 of FIGS. 4 and 8, removing partial standby power. As is illustrated, the load supply is at 24V in normal operation and 0V in standby mode. The Q2 Gate Vg is at 15V in normal operation and 0V in standby mode. The Vy is at 5V in normal operation and 0V in standby mode. The VB and Timer Vr are at 5V in all modes. The PCU Reset Signal and Timer Vct are also at 0V in all modes. Finally, the Standby Signal Va is at 5V in normal operation and 0V in standby mode. The PCU 110 (FIGS. 4 and 8) sends 0V to change normal operation to standby mode, as is illustrated. This causes the Va of 0V at the AND gate 309 (FIG. 9), with the VB at the AND gate 309 at the 5V. The 0V Vy at the AND gate 309 and voltage comparator 311 (FIG. 9) which is compared with the Vth to yield the 0V standby Q2 Gate Vg, which controls switching of the 24V loads 106 (FIG. 9). The auto reset timer circuit 306 (FIG. 9) energizes the switch 134 (FIG. 9) after a predetermined shutdown time period (e.g. 1 sec or 10 sec), such as after a reset. Referring again to FIG. 9, the auto reset timer circuit 306 is coupled to the PCU 110 by a reset circuit that receives the rest pulse signal, and has ground, timer, and Q1 Gate connections by which the auto reset timer circuit 306 is coupled to the AND gate 309, voltage comparator 311, Q2 Gate, and switch 134.

Figure 11:
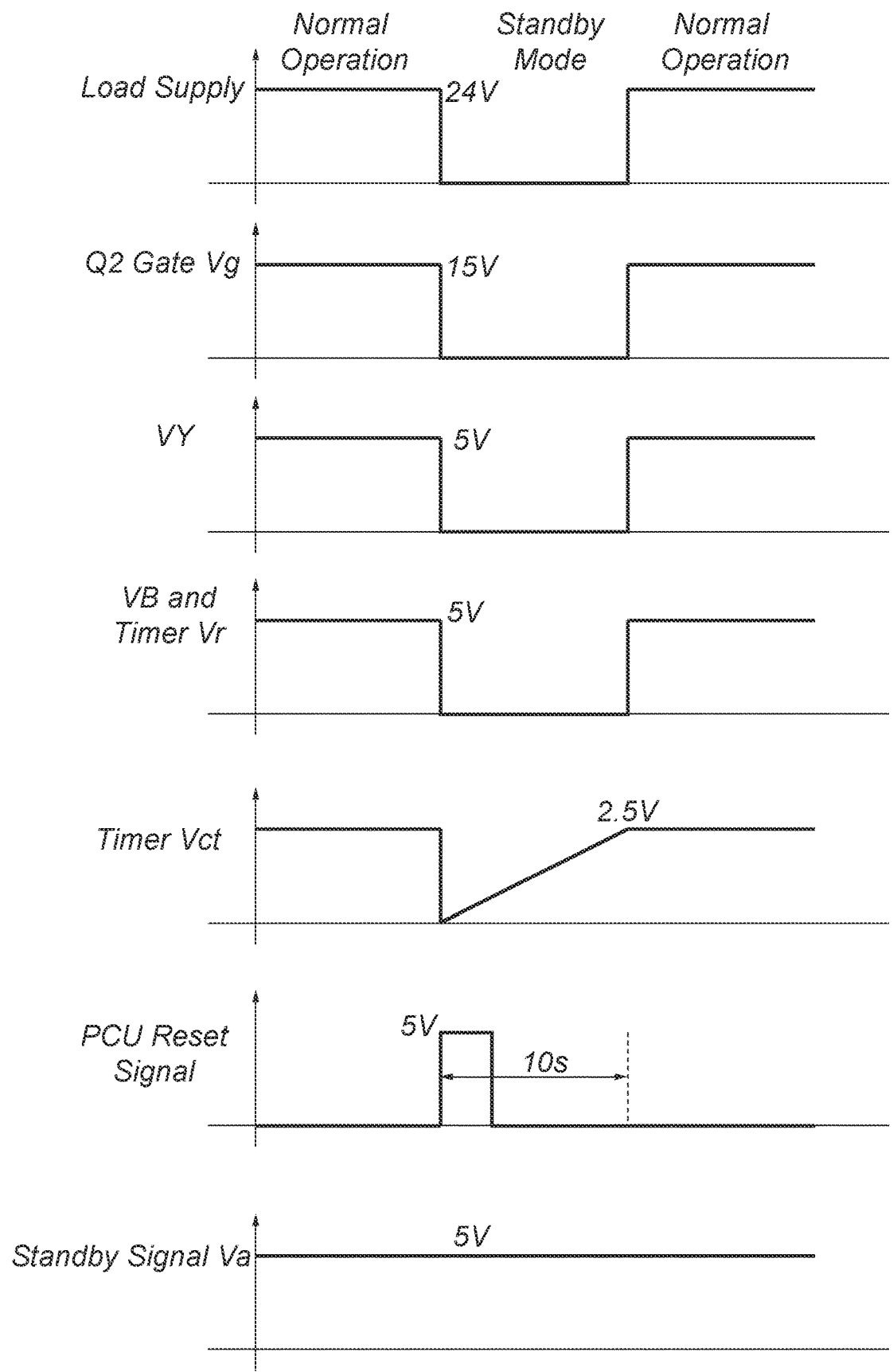
FIG. 11 is a time diagram illustrating reset mode operation of the DCFC system and method of FIGS. 4 and 8, removing partial standby power.

FIG. 11 is a time diagram illustrating reset mode operation of the DCFC system and method 300 of FIGS. 4 and 8, removing partial standby power. As is illustrated and referring to the voltages described herein above, the load supply is at 24V in normal operation and 0V in standby mode. The Q2 Gate Vg is at 15V in normal operation and 0V in standby mode. The Vy is at 5V in normal operation and 0V in standby mode. The VB and Timer Vr are at 5V in normal operation and at 0V in standby mode. The Timer Vct is initially at 0V in normal operation and subsequently ramps to 2.5V in standby mode, where it remains in subsequent normal operation. The PCU Reset Signal is at 0V in normal operation, but includes a pulse signal to 5V during standby mode, which is illustrated as being 10 sec in this case. Finally, the Standby Signal Va is at 5V in all modes. The PCU 110 (FIGS. 4 and 8) sends the 5V to change normal operation to reset. After 10 sec, for example, the system turns all loads on again.

Figure 12:
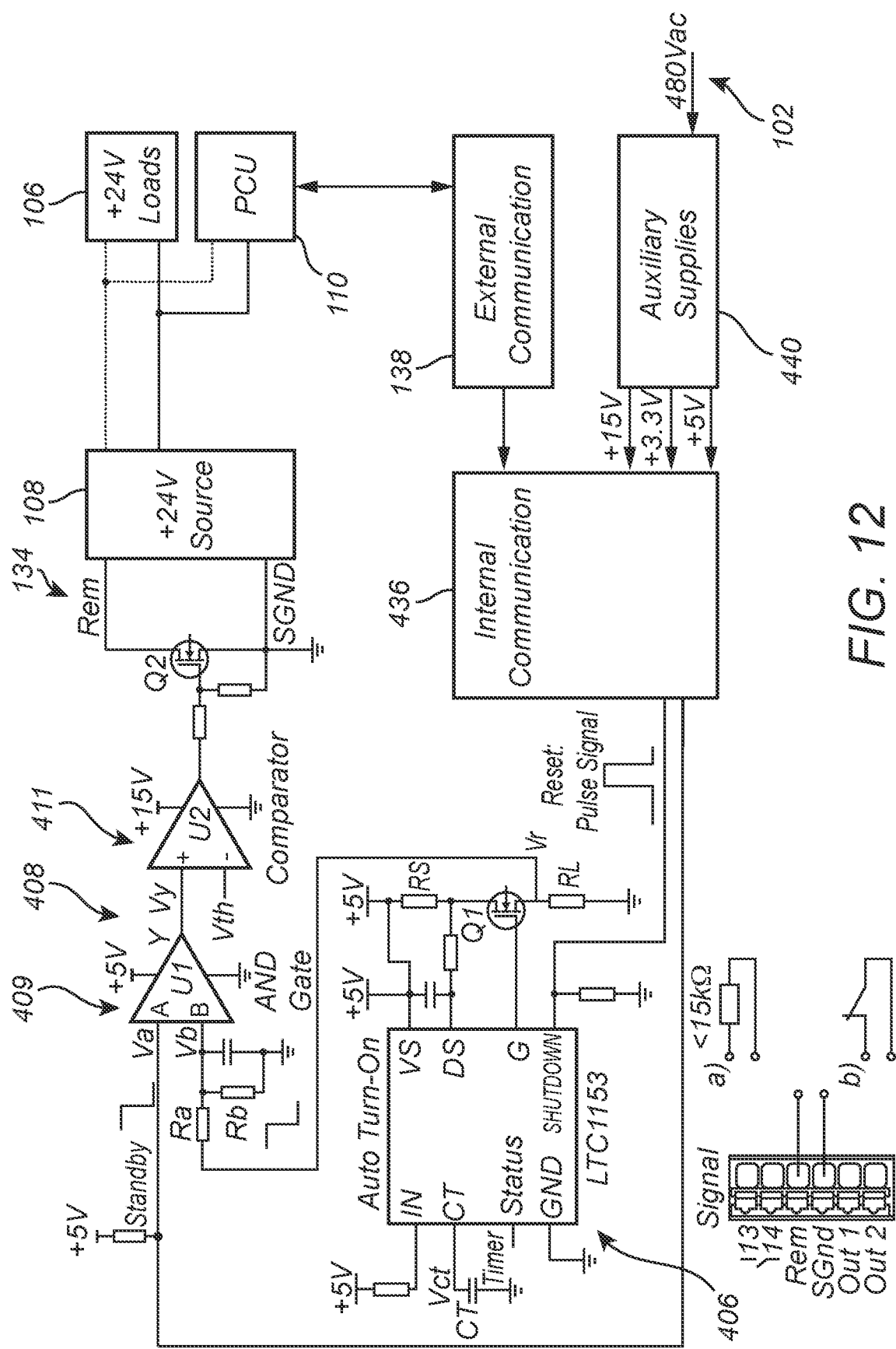
FIG. 12 is a schematic diagram illustrating one example implementation of the DCFC system and method of FIG. 5, again removing partial standby power.

FIG. 12 is a schematic diagram illustrating one example implementation of the DCFC system and method 400 of FIG. 5, again removing partial standby power. The relay/switch circuit 134 is again used for partially removing the 24 VDC loads 106 from the 24V supplies 108. Here, the 24V supplies 108 may be disabled if they offer a "sleep" feature. As a result, the 24V supplies 108 and the master controller 110 are off or get reset during standby mode. An auxiliary power supply 440 is necessary to maintain communication between the internal communication and control system 436 and the external communication link 138 when the 24V supplies 108 are disabled. This auxiliary power supply 440 can be a battery, or a 480 VAC powered rectifier and isolated DC-DC converter. The auto reset timer circuit 406 again energizes the switch 134 after a predetermined shutdown time period (e.g. 1 sec or 10 sec), such as after a reset. The ON/OFF conditioning circuit 408 includes an AND gate 409 and a voltage comparator 411 for signal conditioning, and Vth can be adjustable. It should be noted that the voltage comparator 411 changes logic in this case. Here, reset is again accomplished using a pulse signal. As illustrated, generally before configuring the power supply 108, it should be either disconnected from the supply voltage 102 or switched to "sleep" mode, which is utilized here. To switch the power supply 108 to "sleep" mode, one of the external circuits is used. The illustrated connection versions are possible between the remote input (Rem) and the signal ground (SGnd) connection terminal blocks.

Figure 13:
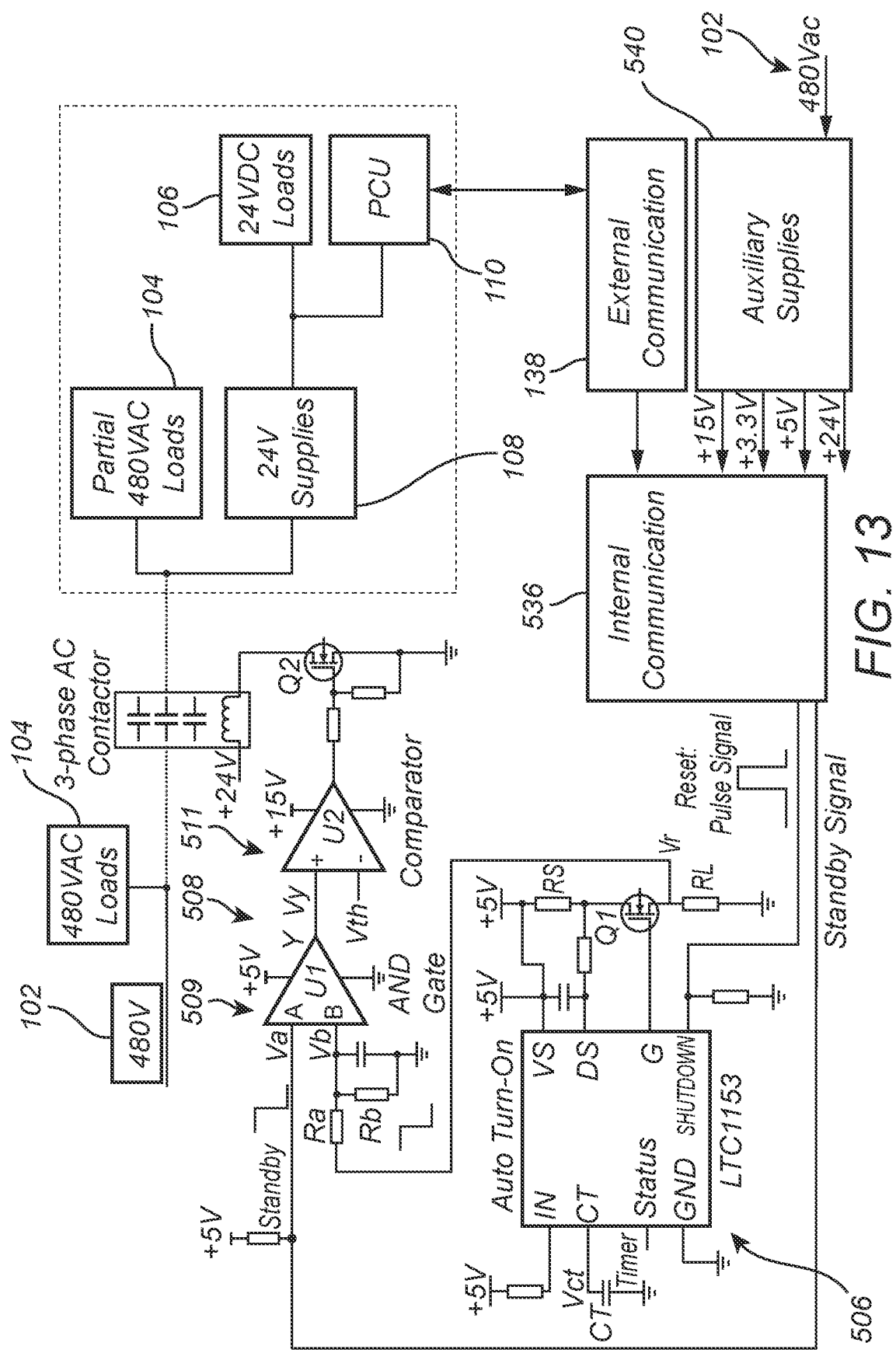
FIG. 13 is a schematic diagram illustrating one example implementation of the DCFC system and method of FIG. 6, again removing partial standby power.

FIG. 13 is a schematic diagram illustrating one example implementation of the DCFC system and method 500 of FIG. 6, again removing partial standby power. Here, the relay/switch circuit 134 is used for removing the 24 VDC loads 106, the 24V supplies 108, and some of the 480 VAC loads 104 that have relatively lower power, such as the fans and the like. The switch 134 consists of a 3-phase AC contactor with a relatively low current rating, such as 20A, with a 24V DC coil used as the disconnection switch itself. An auxiliary power supply 540 is necessary to maintain communication between the internal communication and control system 536 and the external communication link 138 when the 24V supplies 108 are lost. This auxiliary power supply 540 can again be a battery, or a 480 VAC powered rectifier and isolated DC-DC converter. The auto reset timer circuit 506 again energizes the switch 134 after a predetermined shutdown time period (e.g. 1 sec or 10 sec), such as after a reset. The ON/OFF conditioning circuit 508 includes an AND gate 509 and a voltage comparator 511 for signal conditioning, and Vth can be adjustable. Here, reset is again accomplished using a pulse signal.

Figure 14:
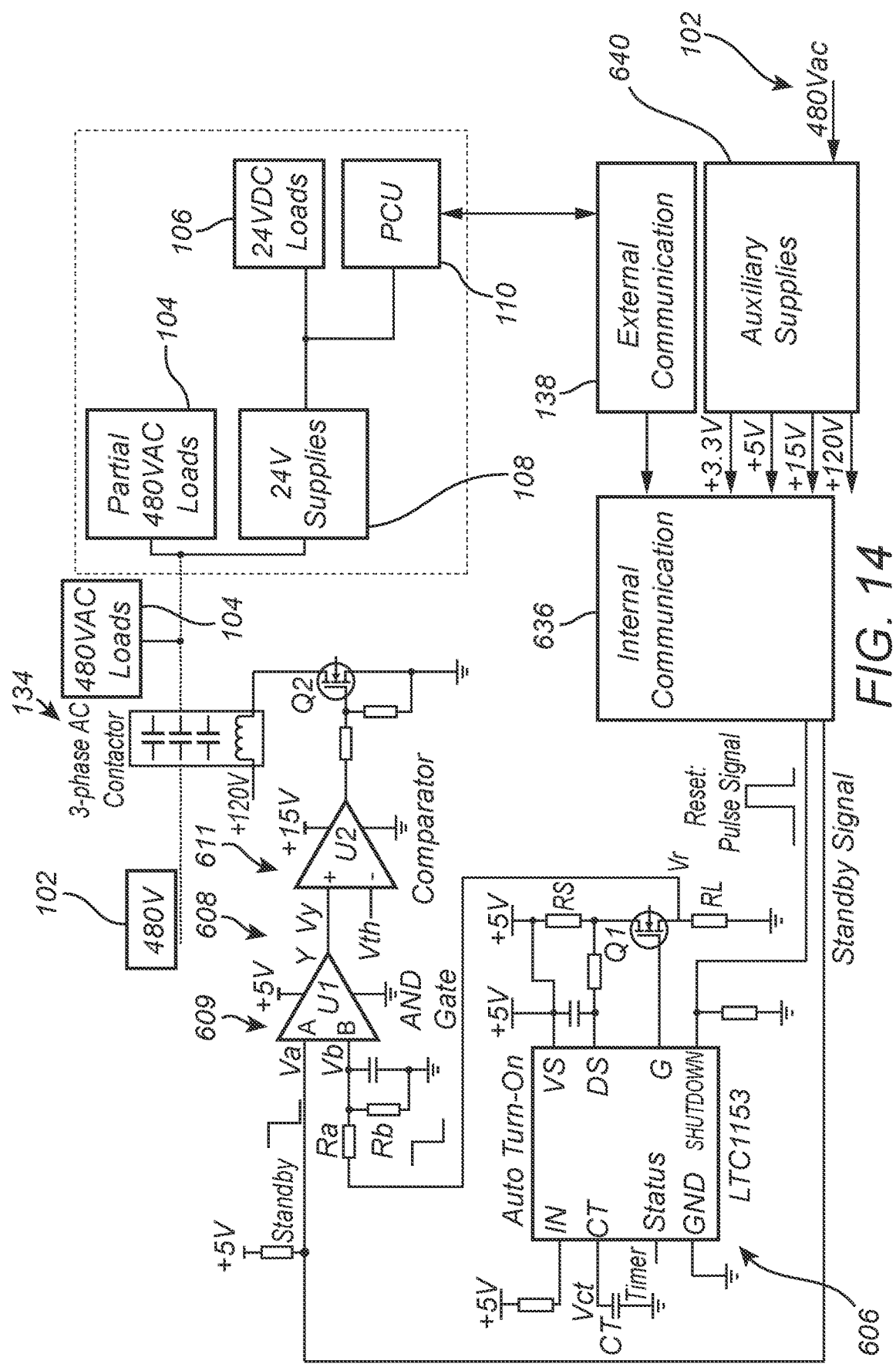
FIG. 14 is a schematic diagram illustrating one example implementation of the DCFC system and method of FIG. 7, removing substantially all standby power.

FIG. 14 is a schematic diagram illustrating one example implementation of the DCFC system and method 600 of FIG. 7, removing substantially all standby power. Here, the relay/switch circuit 134 is used for removing the 24 VDC loads 106, the 24V supplies 108, and all of the 480 VAC loads 104. The switch 134 consists of a 3-phase AC contactor with a relatively high current rating, such as 500 A, with a 120V DC coil used as the disconnection switch itself. An auxiliary power supply 640 is necessary to maintain communication between the internal communication and control system 636 and the external communication link 138 when the 24V supplies 108 are lost, as well as power the DC coil of the AC contactor(s). This auxiliary power supply 640 can again be a battery, or a 480 VAC powered rectifier and isolated DC-DC converter. The auto reset timer circuit 606 again energizes the switch 134 after a predetermined shutdown time period (e.g. 1 sec or 10 sec), such as after a reset. The ON/OFF conditioning circuit 608 includes an AND gate 609 and a voltage comparator 611 for signal conditioning, and Vth can be adjustable. Here, reset is again accomplished using a pulse signal.

FIG. 15 is a schematic diagram illustrating one example auxiliary power supply 140 of the present disclosure. The 480 VAC input 102 can be 1-phase or 3-phase with rectifier operation from AC-DC power conversion. The isolated DC-DC converter 800 provides multiple DC outputs, such as 3.3V, 5V, 15V, 24V, and 120V, with an optional flyback topology utilized. This provides extremely low standby power, when needed. Here, surge protection 502 and EMI filtering 116 are required.

Thus, the present disclosure provides a DCFC system and associated method that lower standby power dramatically when the DCFC system is not in operation, and that provide a reset capability (e.g. 24V) for communication needs. The DCFC system of the present disclosure utilizes an appropriate load disconnection switch and an associated control and communication circuit, timer circuit, and automatic turn on system. This improves the reliability of the electronics by removing voltage stress during the standby mode. The DCFC system of the present disclosure prevents energy waste, and therefore provides a "green" alternative to conventional DCFC systems.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A battery charging system, comprising:
   a voltage input;

one or more secondary power supplies coupled to the voltage input and configured to receive the voltage input and output a voltage lower than the voltage input;

direct loads coupled to the voltage input;

indirect loads configured to be coupled to the one or more secondary power supplies;

a switch disposed between the indirect loads and the one or more secondary power supplies; and a control and communications circuitry coupled to the switch to control the switch with the battery charging system in a standby mode, the control and communications circuitry including a timing circuit, the timing circuit configured to cause the control and communications circuitry to selectively disconnect certain of the indirect loads from the one or more secondary power supplies, while maintaining at least some of the direct loads coupled with the voltage input, with the battery charging system in the standby mode and subsequently reconnect the certain of the indirect loads to the one or more secondary power supplies after a predetermined period of time.

2. The battery charging system of claim 1, wherein the control and communications circuitry is configured to control the switch to selectively disconnect all of the indirect loads from the one or more secondary power supplies with the battery charging system in the standby mode.

3. The battery charging system of claim 1, wherein at least a portion of the control and communications circuitry is powered by the one or more secondary power supplies.

4. The battery charging system of claim 1, wherein at least a portion of the control circuit and communications circuitry is powered by an auxiliary power supply coupled to the voltage input.

5. The battery charging system of claim 1, wherein certain of the one or more secondary power supplies are turned off in the standby mode.

6. The battery charging system of claim 1, wherein the timing circuit is configured to, after the predetermined period of time, restore a charging mode of the battery charging system after the battery charging system is put into the standby mode by selectively reconnecting the certain of the indirect loads to the one or more secondary power supplies.

7. The battery charging system of claim 1, wherein at least a portion of the control and communications circuitry is directly coupled with the switch.

8. The battery charging system of claim 1, wherein the direct loads operate at a voltage of the voltage input and the indirect loads operate at a voltage lower than a voltage of the voltage input.

9. The battery charging system of claim 8, wherein the direct loads are 300-500V loads.

10. A battery charging system, comprising:
a voltage input;
direct loads configured to be coupled to the voltage input;
one or more secondary power supplies coupled to the voltage input and configured to receive the voltage input and output a voltage lower than the voltage input;
indirect loads configured to be coupled to the one or more secondary power supplies;
a switch disposed between the voltage input and the direct loads, the one or more secondary power supplies, and the indirect loads; and
a control and communications circuitry coupled to the switch to control the switch with the battery charging system in a standby mode, the control and communications circuitry including a timing circuit,
the timing circuit configured to cause the control and communications circuitry to selectively disconnect certain of the direct loads, the one or more secondary power supplies, and the indirect loads from the voltage input, while maintaining at least some of the direct loads coupled with the voltage input, with the battery charging system in the standby mode and subsequently reconnect the certain of the direct loads, the one or more secondary power supplies, and the indirect loads with the voltage input after a predetermined period of time.

11. The battery charging system of claim 10, wherein the control and communications circuitry is configured to control the switch to selectively disconnect all of the direct loads, the one or more secondary power supplies, and the indirect loads from the voltage input with the battery charging system in the standby mode.

12. The battery charging system of claim 10, wherein at least a portion of the control and communications circuitry is powered by the one or more secondary power supplies.

13. The battery charging system of claim 10, wherein one or more of the control circuit and the communications circuit are powered by an auxiliary power supply coupled to the voltage input.

14. The battery charging system of claim 13, further comprising a surge protector coupled to the auxiliary power supply.

15. The battery charging system of claim 10, further comprising one or more additional direct loads coupled to the voltage input between the voltage input and the switch.

16. The battery charging system of claim 10, wherein the timing circuit is configured to, after the predetermined period of time, restore a charging mode of the battery charging system after the battery charging system is put into the standby mode by selectively reconnecting the certain of the direct loads, the one or more secondary power supplies, and the indirect loads to the voltage input.

17. The battery charging system of claim 10, wherein at least a portion of the control and communications circuitry is directly coupled with the switch.

18. The battery charging system of claim 10, wherein the direct loads operate at a voltage of the voltage input and the indirect loads operate at a voltage lower than a voltage of the voltage input.

19. The battery charging system of claim 18, wherein the direct loads are 300-S00V loads.

20. A battery charging method, comprising:
selectively disconnecting, by a switch disposed between indirect loads and one or more secondary power supplies, certain indirect loads from the one or more secondary power supplies coupled to a voltage input and configured to receive the voltage input and output a voltage lower than the voltage input with the battery charging system in a standby mode;
wherein direct loads are also coupled to the voltage input; and
wherein the certain indirect loads are selectively disconnected from the one or more secondary power supplies using a control and communications circuitry coupled with the switch, wherein a timing circuit causes the control and communications circuitry to selectively disconnect certain of the indirect loads from the one or more secondary power supplies with the battery charging system in the standby mode, while maintaining at least some of the direct loads coupled with the voltage input, and subsequently reconnect the certain of the indirect loads to the one or more secondary power supplies after a predetermined period of time.

21. A battery charging method, comprising:

selectively disconnecting, by a switch disposed between indirect loads and one or more secondary power supplies, certain of direct loads, one or more secondary power supplies configured to receive a voltage input and output a voltage lower than the voltage input, and indirect loads coupled to the one or more secondary power supplies from the voltage input when the battery charging system is in a standby mode;

wherein the certain of the direct loads, the one or more secondary power supplies, and the indirect loads are selectively disconnected from the voltage input using a control and communications circuitry coupled with the switch, wherein a timing circuit causes the control and communications circuitry to selectively disconnect certain of the direct loads, the one or more secondary power supplies, and the indirect loads, while maintaining at least some of the direct loads coupled with the voltage input, with the battery charging system in the standby mode and subsequently reconnect the certain of the direct loads, the one or more secondary power supplies, and the indirect loads after a predetermined period of time.

* * * * *